United States Patent [19]

Mettler et al.

[11] Patent Number: 4,667,530
[45] Date of Patent: May 26, 1987

[54] VARIABLE LENGTH SHAFT ASSEMBLY PARTICULARLY FOR MOTOR VEHICLE STEERING SHAFTS

[75] Inventors: Karl Mettler, Triesen; Max Oertle, Mauren; Hermann Spöttl, Feldkirch-Tisis, all of Austria

[73] Assignee: Etablissement Supervis, Vaduz, Austria

[21] Appl. No.: 770,625

[22] Filed: Aug. 28, 1985

[30] Foreign Application Priority Data

Jul. 22, 1985 [AT] Austria .................................. 2159/85

[51] Int. Cl.⁴ .............................................. B62D 1/18
[52] U.S. Cl. ...................................... 74/493; 403/225; 403/359; 464/89; 464/162; 74/586
[58] Field of Search ................... 74/485, 492, 493, 586; 464/89, 162; 403/225, 359

[56] References Cited

U.S. PATENT DOCUMENTS

| 2,199,926 | 5/1940 | Swennes | 464/89 |
| 2,272,900 | 2/1942 | Saurer | 74/492 |
| 2,772,104 | 11/1956 | Thiry | 403/225 |
| 3,373,630 | 3/1968 | Heurtebise | 74/492 |
| 3,486,396 | 12/1969 | Yoshioka et al. | 74/492 |
| 3,604,285 | 9/1971 | Olsson | 74/492 |
| 3,714,841 | 2/1973 | Grosseau | 74/492 |
| 4,310,063 | 1/1982 | Nishikawa | 74/492 |
| 4,452,591 | 6/1984 | Fishbaugh et al. | 464/89 |

FOREIGN PATENT DOCUMENTS 2114718 8/1983 United Kingdom ................. 74/492

Primary Examiner—Alan Cohan
Assistant Examiner—John A. Rivell
Attorney, Agent, or Firm—Toren, McGeady and Goldberg

[57] ABSTRACT

A variable length shaft assembly particularly for steering shafts in motor vehicles, wherein a pair of telescopically axially displaceable shaft members have a resilient sliding sleeve interposed therebetween, with the sleeve being affixed to one of the shaft members and with pairs of radially extending fins formed longitudinally along the sliding sleeve being radially directed toward the other shaft member to effect deformation and a resilient force attending to eliminate the feeling of play between the shaft members during operation of the steering assembly.

12 Claims, 7 Drawing Figures

VARIABLE LENGTH SHAFT ASSEMBLY PARTICULARLY FOR MOTOR VEHICLE STEERING SHAFTS

The present invention relates generally to shaft assemblies which are variable in length and more particularly to a shaft assembly which is adaptable for use as the steering shaft in steering devices of motor vehicles.

The invention generally relates to assemblies which comprise at least two coaxially arranged shaft members, with at least one of these shaft members being formed as a tubular piece into which the other member is inserted by its end piece and is slidably mounted therein, but held for mechanical transmission of torque. The outer peripheral contour of the inner member matches the inner peripheral contour of the outer member at least areawise and there is arranged between paired portions of the members a sliding sleeve enabling axial displacement therebetween, the sliding sleeve being made of macromolecular material which is firmly connected with one of the shaft members.

In the prior art, shafts of this kind are known, for example, from British Pat. Nos. 1 328 200 and 1 542 127, wherein there are disclosed designs of such shafts which may be used as steering shafts for motor vehicles. In such devices, one section of the steering shaft is mounted on the vehicle body, for example, on a part of the dashboard and the other section or shaft member is mounted on the axle of the vehicle. During the final assembly of the vehicle, the two parts are fitted together. During operation, these parts of the steering shaft will move axially relative to each other since the axle portion on which the steering shaft assembly is mounted will move relative to the vehicle body. In such assemblies, some play, albeit slight, must exist between these parts of the shaft assembly. This is necessary in order that the steering shaft or the sections thereof forming the steering assembly may be fitted together in the final assembly without special effort and without the aid of special tools. Also, the play is necessary in order to enable the fitted parts to move relative to each other without frictional losses during operation.

However, it has been found that play, which is provided for these purposes, tends to impair ease of steering.

Accordingly, the present invention is directed toward providing an improved steering shaft assembly of this type which may be variable in length and which may be used particularly for motor vehicle steering shaft assemblies to the effect that this necessary play may no longer be perceived by an operator of the motor vehicle.

SUMMARY OF THE INVENTION

Briefly, the present invention may be defined as a shaft assembly capable of length variation, particularly suitable for use in the steering shaft assembly of a motor vehicle, comprising at least two axially arranged shaft members telescopically joined together to effect mechanical transmission of torque, said members comprising an outer tubular member and an inner member slidably inserted within the outer member. The outer member is formed with an inner peripheral wall and the inner member defines an outer peripheral wall, with said inner and outer peripheral walls being shaped for complementary interfitting relationship. A resilient sleeve made of macromolecular material is fitted between the inner and outer peripheral walls in order to effect sliding interfitting engagement between the shaft members, said sleeve being firmly affixed on one side thereof to one of the inner and outer members. The sleeve is formed with pairs of resilient fins which extend longitudinally along the sleeve on the side thereof opposite said one side which is firmly affixed to said one member. The resilient fins extend into engagement with the other shaft member, with the fins being thereby subjected to resilient deformation to apply a resilient force between the inner and outer shaft members.

The resilient fins operate to provide the advantages, in accordance with the invention, in that they protrude into a free space defined between the shaft members and extend in the axial direction of the shaft assembly in order to apply against the walls thereof a resilient force, whereby the fins are subjected to deformation. In addition to improved ease of steering which is effected thereby, the arrangement in accordance with the invention, also permits a simple and play-free vertical and/or longitudinal adjustment of the steering wheel so that expensive serrations which have until now been used can be avoided.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
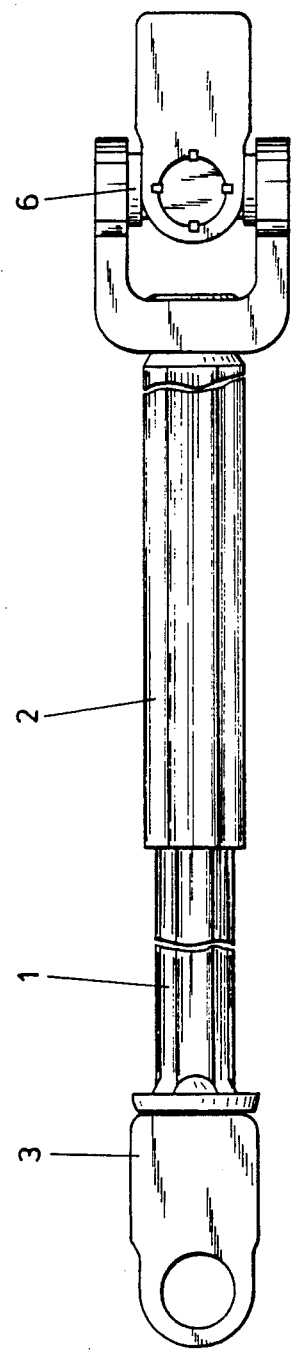
FIG. 1 is a front view of a steering shaft assembly in accordance with the invention.
Figure 2:
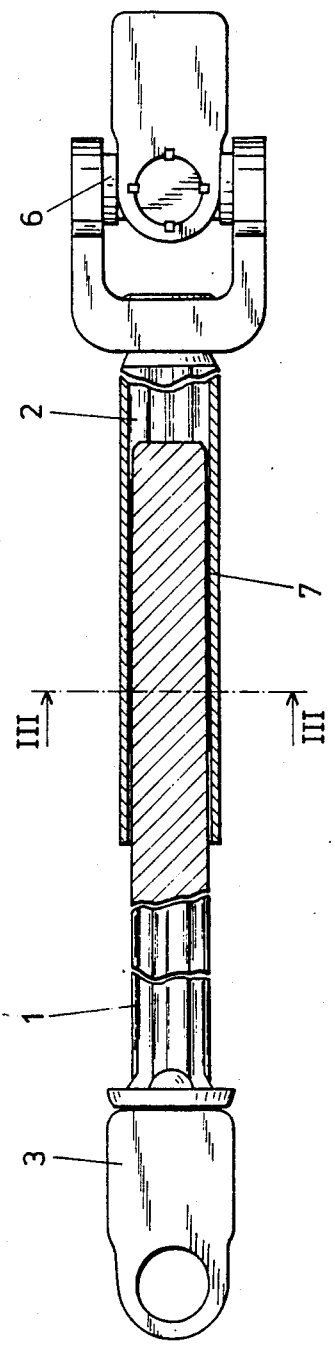
FIG. 2 is a sectional view of the shaft assembly shown in FIG. 1.
Figure 3:
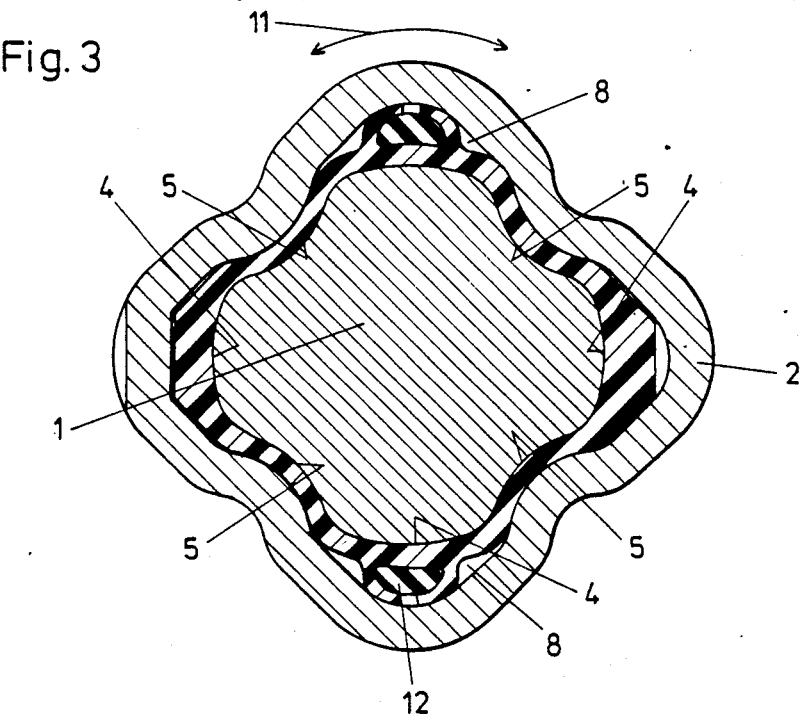
FIG. 3 is a transverse sectional view taken along the line III—III of FIG. 2.

Referring now to the drawings, and more particularly to FIGS. 1–5, wherein there is depicted a first embodiment of the invention, the shaft assembly, in accordance with the invention, is shown as basically consisting of a first shaft section or member 1 having a solid cross-section which carries at one end thereof a shaped part or attachment member 3 adapted to enable other parts of a steering device to be connected with the assembly of the invention. The shaft member 1 is essentially formed as a rolled, cold-extruded or drawn member from solid material and its cross-section is best seen in FIG. 3. This cross-sectional configuration of the member 1 is formed with rounded corner areas between which there are defined indentations or grooves 5, the transition between the corners and the grooves being gradual.

A second shaft member 2 which carries a hinge pin 6 at the end thereof is formed as a tubular member and is shaped with an internal cross-sectional configuration which approximately matches the external configuration of the shaft member 1. The internal configuration or wall of the outer member 2 and the outer peripheral configuration or wall of the internal or inner member 1 are shaped for complementary interfitting engagement and, as best seen in FIG. 3, the outer shape of the shaft section 1 approximately matches the inner peripheral wall of the tube 2 inasmuch as the hollow tubular member 2 is formed with rounded corner areas and grooves therebetween having an overall configuration conforming with the member 1. The inner dimensions of the outer member 2 and the outer dimensions of the inner member 1 are so different that between the two parts considerable play exists. Thus, it will be seen that a gap is provided between the members 1 and 2. In order to bridge this gap and overcome the play created thereby and to support sliding of the members 1 and 2 relative to each other, there is attached at the inner member 1 a sliding sleeve 7 made of suitable plastic material having a low coefficient of friction whose peripheral contour matches that of the member 1 upon which it is carried. The sleeve 7 has a wall thickness S which is dimensioned such that it bridges the gap between the members 1 and 2 so as to reduce the play therebetween, with the sleeve section carried by the member 1 and connected therewith applying against the wall of the outer member 2 only areawise, so that there remains free spaces 8 between the outer wall of the sleeve 7 and the inner wall of the outer member 2.

The wall thickness S of the sliding sleeve 7 is further dimensioned so that no major pressure acting in the radial direction is exerted on it by the receiving section or member.

Figure 4:
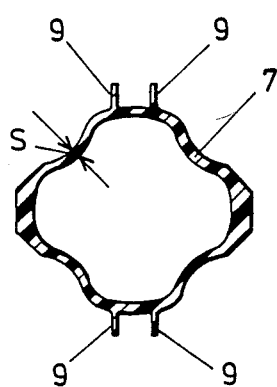
FIG. 4 is a transverse sectional view taken through the sliding sleeve of the invention.
Figure 5:
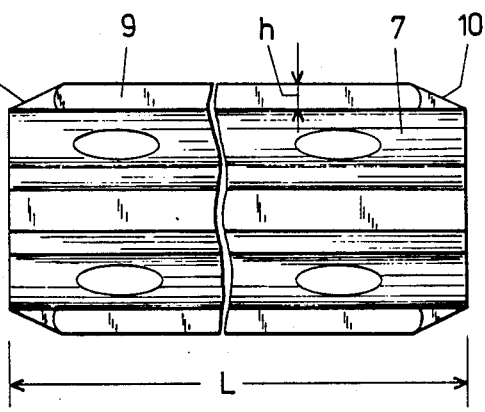
FIG. 5 is a side view of the sleeve depicted in FIG. 4.

The sliding sleeve 7 which is utilized in the embodiment of the invention described herein is best illustrated in FIGS. 4 and 5 and is there shown as being formed at diammetrically opposed points with pairs of lips or fins 9 which extend longitudinally in the axial direction of the sleeve 7 over a length dimension L thereof and radially therefrom. The fins or lips 9 are formed with beveled end faces 10.

The fins 9 are also dimensioned with a radial height h which is somewhat greater than the distance of the free space 8 defined between the outer wall of the sleeve 7 and the inner wall of the outer shaft member 2 so that, when the shaft member 1 with the sleeve 7 mounted thereon is inserted into the hollow shaft member 2, the fins or lips 9 will be deformed, as seen in FIG. 3, and thus, will create a resilient or spring force in both directions of rotation indicated by arrow 11, thereby bringing about a characteristic for the steering mechanism, such that the person or operator of the steering mechanism will no longer have the sensation that play exists between the two shaft members 1 and 2. The wall thickness S of the sliding sleeve 7 is dimensioned so that, although it bridges the gap or play existing between the members 1 and 2, it is not thereby stressed in the radial direction, since it must be possible, of course, to move the assembled sections 1 and 2 relative to each other without special effort and without special frictional losses.

The described effect of the sliding sleeve 7 is further improved by insertion of a solid cord or member 12 of permanently elastic material, for example, a rubber cord, between the two fins or lips 9 before the shaft members 1 and 2 are fitted together. Due to the beveled end faces 10 on the ends of the fins 9, the cord 12 can be inserted together with the shaft member on which it is mounted without special effort and without the aid of special tools. The cross-section of the rubber cord 12 is appropriately selected so that it is somewhat greater than the spacing between the fins 9 forming each pair of fins when they are not under load, i.e., as seen in FIG. 4, so that the rubber cord 12 inserted between the unstressed fins 9 will be retained in a clamped position.

Figure 6:
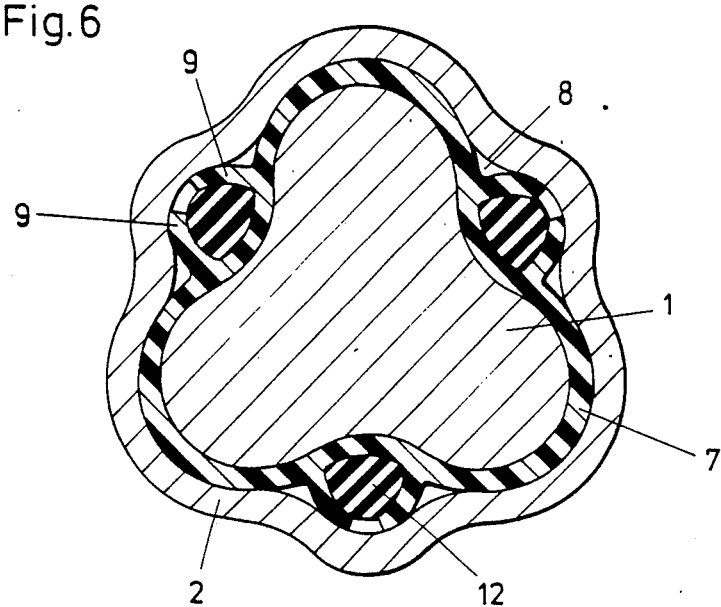
FIGS. 6 and 7 are transverse sectional views taken through other embodiments of steering shafts in accordance with the present invention and depicting the cross-sectional configuration thereof.

Of course, it will be appreciated that the invention may be provided in shapes and configurations deviating from that shown in FIG. 3, and thus, another embodiment of the invention is shown in FIG. 6, wherein a different cross-sectional form for the sliding sleeve 7 is provided which is again fixedly mounted on the shaft part 1.

Figure 7:
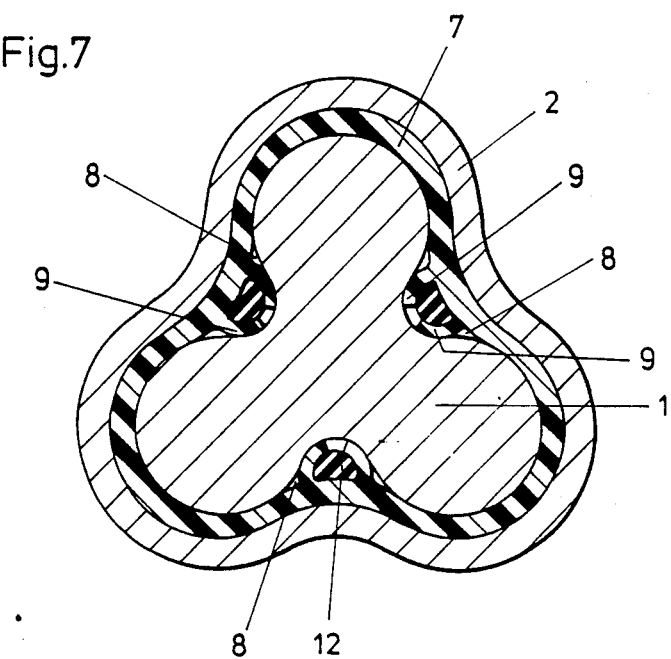

A further embodiment of the invention is shown in FIG. 7.

In the embodiment of FIG. 6, three pairs of fins 9 are provided whereas, in the embodiment of FIGS. 1–5, two pairs of fins 9 were provided.

In FIG. 6, the pairs of fins 9 are shown radially equally angularly spaced about the sliding sleeve 7.

In the embodiment of FIG. 7, the fins 9 are arranged on the inner side of the sliding sleeve 7 as opposed to being arranged on the outer side thereof in the embodiments of FIGS. 1–5 and 6. The sliding sleeve 7, in the embodiment of FIG. 7, is connected with the inner wall of the outer shaft member 2.

Although the embodiments of FIGS. 1–5 and FIG. 6 are the preferred embodiments, the embodiment of FIG. 7 will be found to suitably fulfill the desired purpose, although the other embodiments may exhibit greater ease of assembly.

Thus, from the foregoing, it will be seen that the invention has been described with reference to a steering shaft assembly for the steering device of a motor vehicle. However, it will be understood that the invention is not limited to use in this connection and that it may be appropriately employed wherever a shaft which is variable in length, that is, a telescoping shaft is to be structured to have a minimum play.

Furthermore, although a solid inner shaft member 1 has been shown in the embodiments discussed herein, it should be noted that it is also possible to utilize a hollow member for the shaft member 1, especially when the shaft is large, as, for example, in steering devices for large trucks. In the wall of the sliding sleeve 7, depressions may be provided or also perforations or openings into which lubricant and/or anti-corrosive materials may be introduced before the parts are assembled. Moreover, it is possible to shape the cross-sectional configuration of the parts so that the parts may be fitted together only in a predetermined radial position. For this purpose, the sliding sleeve may be utilized in that its wall thickness may differ taken in the circumferential direction.

Thus, in accordance with the foregoing, it will be seen that the present invention provides a steering shaft assembly for the steering devices of motor vehicles, wherein two axial members 1 and 2 are inserted one within the other and are displaceable one within the other, while in service. The outer peripheral contour of the inner member 1 and the inner peripheral contour of the outer member 2 are made in a matching or complementary configuration with a sliding sleeve 7 being arranged in the space between the two shaft members.

On the side directly opposite the member 1 or 2, displaceable relative to it, the sliding sleeve 7 comprises pairs of spaced lips or fins 9 extending substantially in the longitudinal direction of the sleeve 7 and radially therefrom. The fins 9 protrude into the free space 8 defined between the paired shaft members 1 and 2 and they extend in the axial direction of the shaft and apply against the wall thereof a spring force as a result of deformation of the fins. Owing to this, play between the shaft members 1 and 2 which necessarily exists in such steering shaft assemblies will no longer be perceived by an operator of the motor vehicle, and thereby ease of steering will be enhanced.

While specific embodiments of the invention have been shown and described in detail to illustrate the application of the inventive principles, it will be understood that the invention may be embodied otherwise without departing from such principles.

What is claimed is:

1. A shaft assembly capable of length variation, particularly useful as a sterring shaft for a motor vehicle comprising:
   at least two coaxially arranged shaft members telescopically joined together to effect mechanical transmission of torque, said members comprising an outer tubular member and an inner member slidably inserted within said outer member;
   said outer member having an inner peripheral wall and said inner member having an outer peripheral wall, with said inner and said outer peripheral walls being shaped for complementary interfitting relationship;
   a sliding sleeve made of macromolecular material fitted between said inner and outer peripheral walls for effecting sliding interfitting engagement between said shaft members;
   said sliding sleeve being firmly affixed on one side thereof to one of said inner and outer shaft members; and
   pairs of resilient fins formed on a side of said sleeve opposite said one side extending longitudinally therealong and radially therefrom into engagement with the other of said shaft members, said fins being subjected to resilient deformation by compression between said shaft members to apply a resilient force between said inner and outer shaft members;
   said resilient sleeve and said other of said shaft members being configured to provide therebetween a free space into which said resilient fins extend, said free space being larger than a space which would be necessary to merely accommodate said fins.

2. An assembly according to claim 1, wherein said fins are arranged on the outer side of said sliding sleeve.

3. An assembly according to claim 1, wherein said fins are arranged on the inner side of said sliding sleeve.

4. An assembly according to claim 1, wherein said pairs of resilient fins are provided angularly spaced about the periphery of said sliding sleeve.

5. An assembly according to claim 4, wherein said pairs of fins are provided at diammetrically opposed points on said sliding sleeve.

6. An assembly according to claim 1, wherein said fins are formed with beveled end faces at the axial ends thereof.

7. An assembly according to claim 1, wherein said resilient cord is formed with a diameter which is greater by a small amount than the spacing between each of the fins of said pairs of fins so that said cord may be held between said fins of each pair.

8. An assembly according to claim 1, wherein said sliding sleeve is affixed to said inner shaft member and wherein said resilient fins extend radially outwardly from said sleeve.

9. An assembly according to claim 1, wherein said sliding sleeve is affixed to said outer tubular member and wherein said resilient fins extend radially inwardly from said sliding sleeve.

10. A shaft assembly capable of length variation, particularly useful as a sterring shaft for a motor vehicle comprising:
    at least two coaxially arranged shaft members telescopically joined together to effect mechanical transmission of torque, said members comprising an outer tubular member and an inner member slidably inserted within said outer member;
    said outer member having an inner peripheral wall and said inner member having an outer peripheral wall, with said inner and said outer peripheral walls being shaped for complementary interfitting relationship;
    a sliding sleeve made of macromolecular material fitted between said inner and outer peripheral walls for effecting sliding interfitting engagement between said shaft members;
    said sliding sleeve being firmly affixed on one side thereof to one of said inner and outer shaft members;
    pairs of resilient fins formed on a side of said sleeve opposite said one side extending longitudinally therealong and radially therefrom into engagement with the other of said shaft members, said fins being subjected to resilient deformation by compression between said shaft members to apply a resilient force between said inner and outer shaft members; and
    an elongated cord consisting of permanently elastic material arranged between each of the fins of said pairs of resilient fins.

11. A shaft assembly capable of length variation, particularly useful as a steering shaft for a motor vehicle comprising:
    at least two coaxially arranged shaft members telescopically joined together to effect mechanical transmission of torque, said members comprising an outer tubular member and an inner member slidably inserted within said outer member;
    said outer member having an inner peripheral wall and said inner member having an outer peripheral wall, with said inner and said outer oeripheral walls being shaped for complementary interfitting relationship;
    a sliding sleeve made of macromolecular material fitted between said inner and outer peripheral walls for effecting sliding interfitting engagement between said shaft members;
    said sliding sleeve being firmly affixed on one side thereof to one of said inner and outer shaft members; and
    pairs of resilient fins formed on a side of said sleeve opposite said one side extending longitudinally therealong and radially therefrom into engagement with the other of said shaft members, said fins being subjected to resilient deformation by compression to apply a resilient force between said inner and outer shaft members;

said sliding sleeve being formed with a differing wall thickness over the circumference thereof.

12. A shaft assembly capable of length variation, particularly useful as a sterring shaft for a motor vehicle comprising:
- at least two coaxially arranged shaft members telescopically joined together to effect mechanical transmission of torque, said members comprising an outer tubular member and an inner member slidably inserted within said outer member;
- said outer member having an inner peripheral wall and said inner member having an outer peripheral wall, with said inner and said outer peripheral walls being shaped for complementary interfitting relationship;
- a sliding sleeve made of macromolecular material fitted between said inner and outer peripheral walls for effecting sliding interfitting engagement between said shaft members;
- said sliding sleeve being firmly affixed on one side thereof to one of said inner and outer shaft members; and
- pairs of resilient fins formed on a side of said sleeve opposite said one side extending longitudinally therealong and radially therefrom into engagement with the other of said shaft members, said fins being subjected to resilient deformation by compression between said shaft members to apply a resilient force between said inner and outer shaft members;
- said sleeve being formed with at least one of depressions and perforations into which lubricants or anti-corrosive materials may be provided.

* * * * *